United States Patent [19]
Goettelmann et al.

[11] Patent Number: 6,012,875
[45] Date of Patent: Jan. 11, 2000

[54] APPARATUS FOR DISPENSING GRANULAR MATERIAL

[75] Inventors: Keith R. Goettelmann, Franklin; Gary C. Marshall, Oil City, both of Pa.

[73] Assignee: The Conair Group, Inc., Pittsburgh, Pa.

[21] Appl. No.: 08/825,882

[22] Filed: Apr. 2, 1997

[51] Int. Cl.⁷ ................................................. B65G 53/14
[52] U.S. Cl. .......................................... 406/144; 406/194
[58] Field of Search .................... 406/123, 144, 406/194

[56] References Cited

U.S. PATENT DOCUMENTS

| | | | |
|---|---|---|---|
| 2,420,388 | 5/1947 | Thomas | 406/194 |
| 2,821,346 | 1/1958 | Fisher | 406/194 |
| 3,115,278 | 12/1963 | Mylting . | |
| 3,237,805 | 3/1966 | Stogner . | |
| 3,276,821 | 10/1966 | Edwards | 406/194 |
| 3,512,841 | 5/1970 | Kollasch et al. . | |
| 4,215,956 | 8/1980 | Reba | 406/194 |
| 4,381,898 | 5/1983 | Rotolico et al. | 406/144 |
| 4,815,414 | 3/1989 | Duffy et al. | 406/123 |
| 5,494,381 | 2/1996 | Heyl et al. . | |

FOREIGN PATENT DOCUMENTS

| | | |
|---|---|---|
| 375058 | 5/1923 | Germany . |
| 3803012 | 9/1988 | Germany . |
| 267968 | 5/1989 | Germany . |
| 689680 | 4/1952 | United Kingdom . |

OTHER PUBLICATIONS

Conair Franklin, "At–Throat Metering Feeders", Oct. 1993.
Conair Franklin, "Compressed Air Material Loader", Mar. 1996.
Conair Franklin, "Autoweigh Gravimetric Blenders", Sep. 1996.

*Primary Examiner*—Gary C. Hoge
*Attorney, Agent, or Firm*—Buchanan Ingersoll, P.C.

[57] ABSTRACT

A dispensing apparatus dispenses a precisely metered quantity of pellets or granular material from a hopper to a vessel. The hopper which holds the pellets or granular material has a conical bottom portion which terminates in a bottom opening that is in constant communication with a conveyor tube which leads to the vessel. The conveyor tube preferably extends horizontally below the hopper and is in communication with a bottom opening in the hopper. A venturi driven by compressed air is provided in the conveyor tube for creating a vacuum which carries the pellets or granular material from the hopper to the vessel. The pressure of the compressed air entering the venturi is precisely regulated so as to precisely control the amount of pellets or granulated material moved from the hopper to the vessel. Alternatively, a controller can be provided for regulating several conveyor tubes, each to feed a different type of pellet or granular material into the vessel.

18 Claims, 4 Drawing Sheets

APPARATUS FOR DISPENSING GRANULAR MATERIAL

BACKGROUND OF THE INVENTION

1. Field of the Invention

This invention is directed to a unit that dispenses a granular material from a hopper to a granular material storage vessel such as a vessel into which pellets or plastic regrind material is loaded before that material is utilized in an injection molding machine. The unit precisely meters the amount of granular material released from the hopper without the use of a conveyor screw.

2. Description of the Prior Art

Conventionally, granular material, which is intended to be blended with virgin plastic, is dispensed from a hopper to a material storage vessel through conveyor screws which precisely meter the amount of granular material fed from the hopper to the storage vessel. Recently, various pneumatic units have been developed which can also control the transport of powdery or granular material by means of a relative suction and pressure flow rate. Representative of such pneumatic units are German Patent 3,803,012 and British Patent Specification 689,680 which show pneumatic conveyers where a hopper drops a particulate substance into a pipe into which compressed air is injected to move the particulate along. In addition, U.S. Pat. Nos. 3,237,805 and 3,512,841 each disclose method and apparatus for conveying particulate material using a gaseous conveying medium. U.S. Pat. No. 5,494,381 shows a bulk material conveying system in which a closed chamber is subjected to a pressurized gas which causes bulk material in the chamber to flow through an outlet and be conveyed through a conveyor.

Serious disadvantages result from use of the prior art apparatus. The conveyor screw can be quite bulky and requires the addition of a mechanical operation for dispensing granular material. Although the various pneumatic units described above eliminate the added mechanical operation of a conveyor screw, they suffer from the inability to precisely meter and control the amount of particulate or granular material being dispensed.

Accordingly, there is a need for a device that will precisely meter and control the amount of granular material released from a hopper without the use of a mechanical conveyor screw.

SUMMARY OF THE INVENTION

In accordance with the present invention, there is provided a dispensing apparatus which dispenses precisely known quantities of pellets or other granular material from a hopper to a vessel. The hopper which holds the pellets or granulated material has a conical bottom portion which terminates in a bottom opening that is in constant communication with a conveyor tube leading to the vessel. The conveyor tube preferably extends horizontally below the hopper with the hopper bottom opening communicating with the conveyor tube. A venturi driven by compressed air is provided in the conveyor tube for creating a vacuum which carries the pellets or granular material from the hopper to the vessel. The pressure of the compressed air entering the venturi is precisely regulated so as to precisely control the amount of pellets or granulated material moved from the hopper to the vessel.

In order to precisely dispense known quantities of pellets or granular materials, the dispensing apparatus includes means for precisely regulating the pressure of the compressed air entering the venturi. By precisely regulating the pressure of the compressed air entering the venturi, the vacuum created in the venturi can be precisely controlled, thereby precisely controlling the amount of pellets or granular material released from the hopper and conveyed to the vessel.

In a preferred embodiment of the invention, the conveyor tube extends in a direction opposite the vessel towards a drain. A second venturi is placed within the portion of the conveyor tube between the hopper bottom and the drain. This venturi operates in a manner similar to the first venturi and assists in carrying particles to the drain from the hopper.

In an alternative embodiment of the dispensing apparatus, a control box is provided to direct constant pressure to a group of feeder units adapted to feed into the same vessel. Separate hoppers and feeder units are provided for dispensing variable types of additives to a plastic mix.

These and other objects of the present invention will become apparent as this description proceeds in conjunction with the following specification, the accompanying drawings and the appended claims.

DESCRIPTION OF THE PREFERRED EMBODIMENTS

Figure 1:
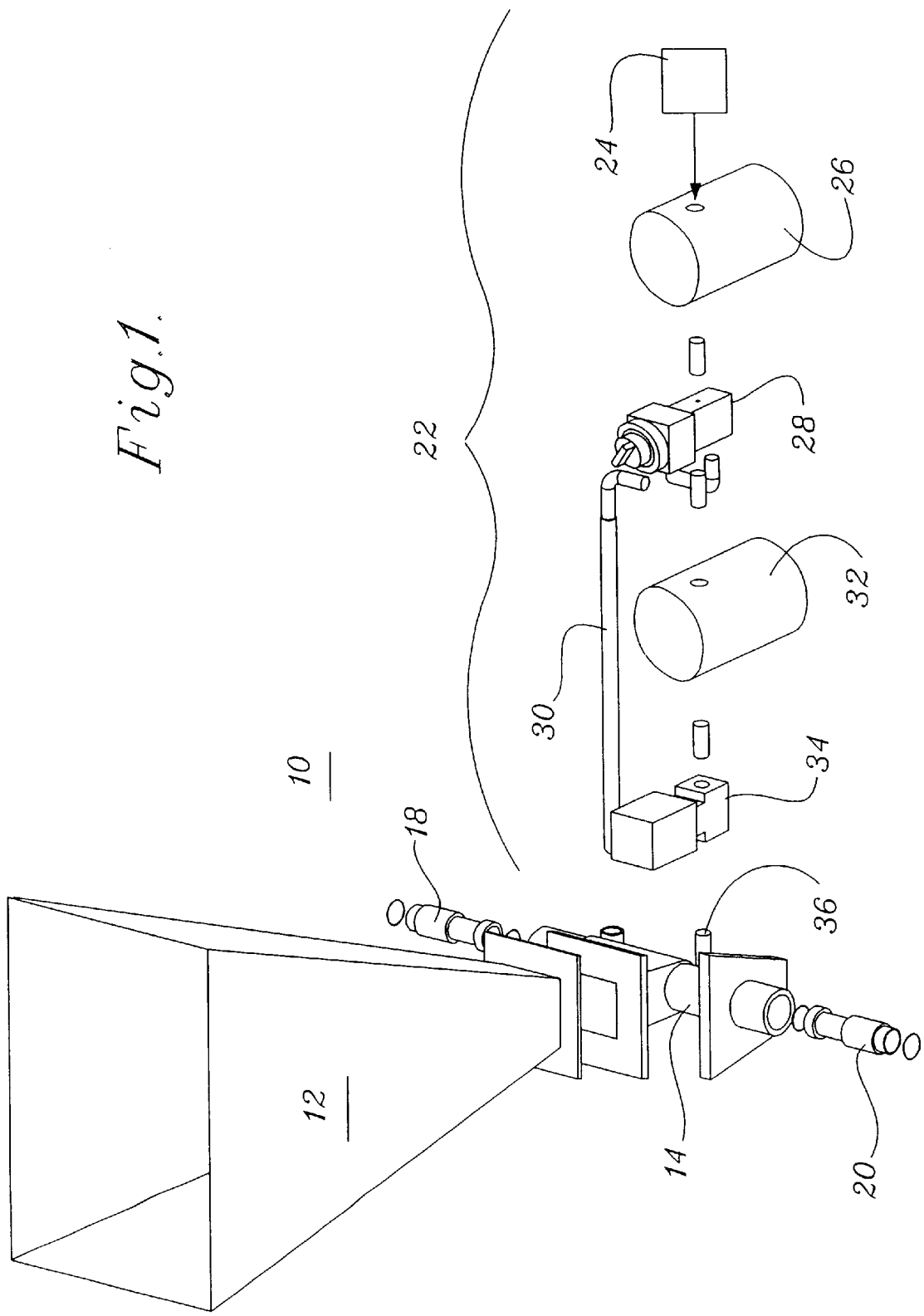
FIG. 1 is an exploded perspective view of the dispensing apparatus of a first presently preferred embodiment of the present invention showing the individual parts.

Referring to the drawings, there is shown in FIG. 1 a dispensing apparatus 10 which includes a hopper 12 into which pellets or granulated material is held for dispensing to a vessel, not shown, for blending with virgin plastic. The pellets or granulated material stored in hopper 12 are released into feeder body 14. Feeder body 14 preferably extends horizontally below the hopper 12 with a bottom opening 16 of hopper 12 communicating with feeder body 14. Connected at opposing ends of feeder body 14 are drain venturi 18 and feed venturi 20. The pellets or granular material stored in hopper 12 are carried through feed venturi 20 to the vessel. When the loading of the pellets or granular material is completed, any remaining pellets can be drained from the hopper 12 through drain venturi 18.

The pellets or granular material are conveyed through feeder body 14 by means of compressed air controlled by pressure regulator system 22. Pressure regulator system 22 controls the pressure and flow rate of the compressed air provided by compressed air source 24. The compressed air from compressed air source 24 is pumped into pressure regulator and filter 26 which is in communication with selector valve 28. Pressure regulator and filter 26 filters the compressed air and reduces the pressure of the compressed air to approximately 30–40 psi. Selector valve 28 directs the compressed air through either connector pipe 30 in the event of a drain operation or through precision pressure regulator 32, solenoid valve 34 and connector pipe 36 in the event of a feed operation. Precision pressure regulator 32 reduces the pressure of the compressed air to the range of 8–10 psi. Precision pressure regulator 32 will only release compressed air at the desired pressure. Solenoid valve 34 is electrically connected with the feeder control and will alternate between "on" and "off" positions for feed operations. In the event of a drain operation, compressed air in the range of 30–40 psi is introduced into drain venturi 18 through selector valve 28. In the event of a feed operation, compressed air at a pressure of 8–10 psi is introduced into feed venturi 20. The features of dispensing apparatus 10 are also shown in a top view in FIG. 2 and in a side view in FIG. 3.

Figure 4:
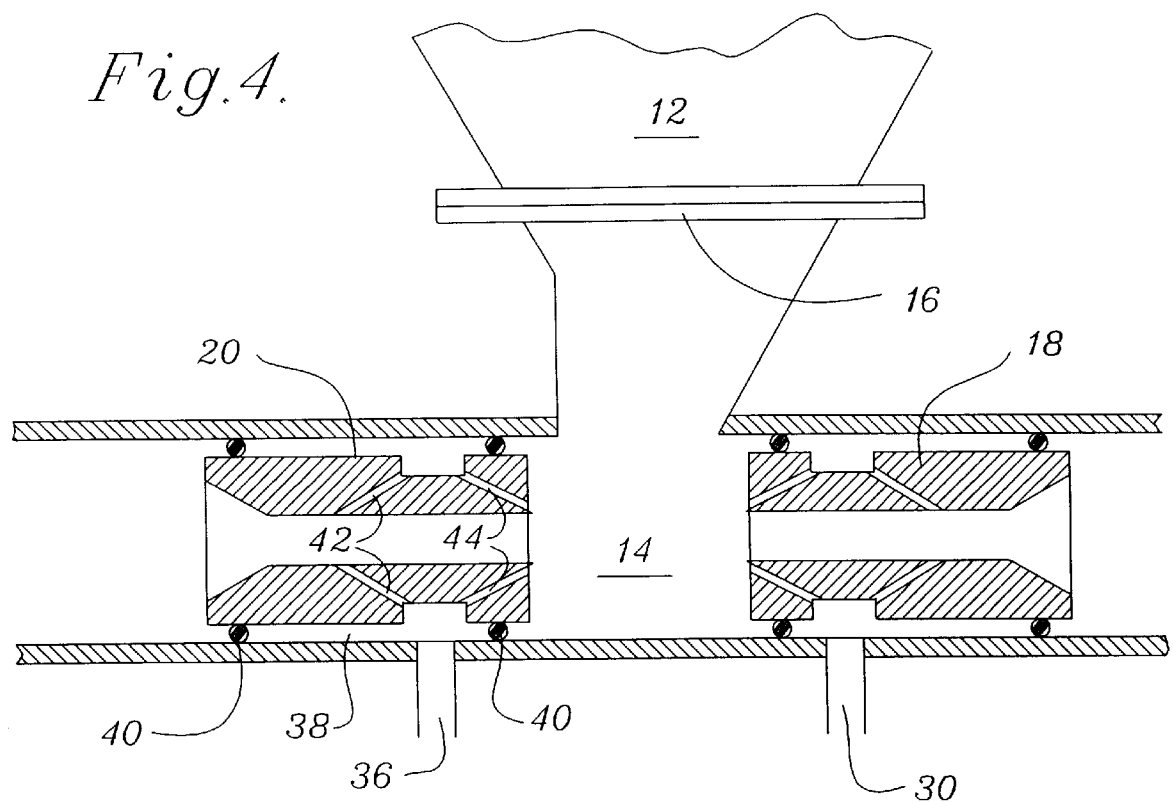
FIG. 4 is a partial sectional view of the dispensing apparatus of FIG. 1 showing a presently preferred embodiment of a pair of venturi units used in the dispensing apparatus.

FIG. 4 illustrates a preferred embodiment of the conveyor tube feeder body 14, feed venturi 20 and drain venturi 18. Feed venturi 20 is operatively connected to connector pipe 36 and is used to convey the pellets and granular material to the vessel. Drain venturi 18 is operatively connected to connector pipe 30 and is used to convey the pellets and granular material to the drain. The operation of the feed venturi 20 and the drain venturi 18 are identical. The operation of both venturi will be discussed below with reference to feed venturi 20.

As compressed air is directed through connector pipe 36, it fills annular chamber 38 which surrounds feed venturi 20. A pair of sealing O-rings 40 are used to seal off chamber 38 from feeder body 14. As the compressed air fills the annular chamber 38, it is directed through passageways 42 which are directed away from the feeder body 14 and toward the vessel. The compressed air passing through passageways 42 creates a vacuum within feed venturi 20 which pulls the pellets and granular material from feeder body 14 through feed venturi 20 to the vessel. A lesser amount of compressed air flows through passageways 44 which are directed toward the feed body 14. The compressed air flowing through passageways 44 aerates the granular material in feeder body 14 and prevents such granular material from plugging the feed venturi 20.

By regulating the pressure entering the venturis 18 and 20, a desired vacuum can be created within feeder body 14. This vacuum determines the quantity of pellets or granular material which is dispensed from hopper 12 into the vessel or drain.

Figure 2:
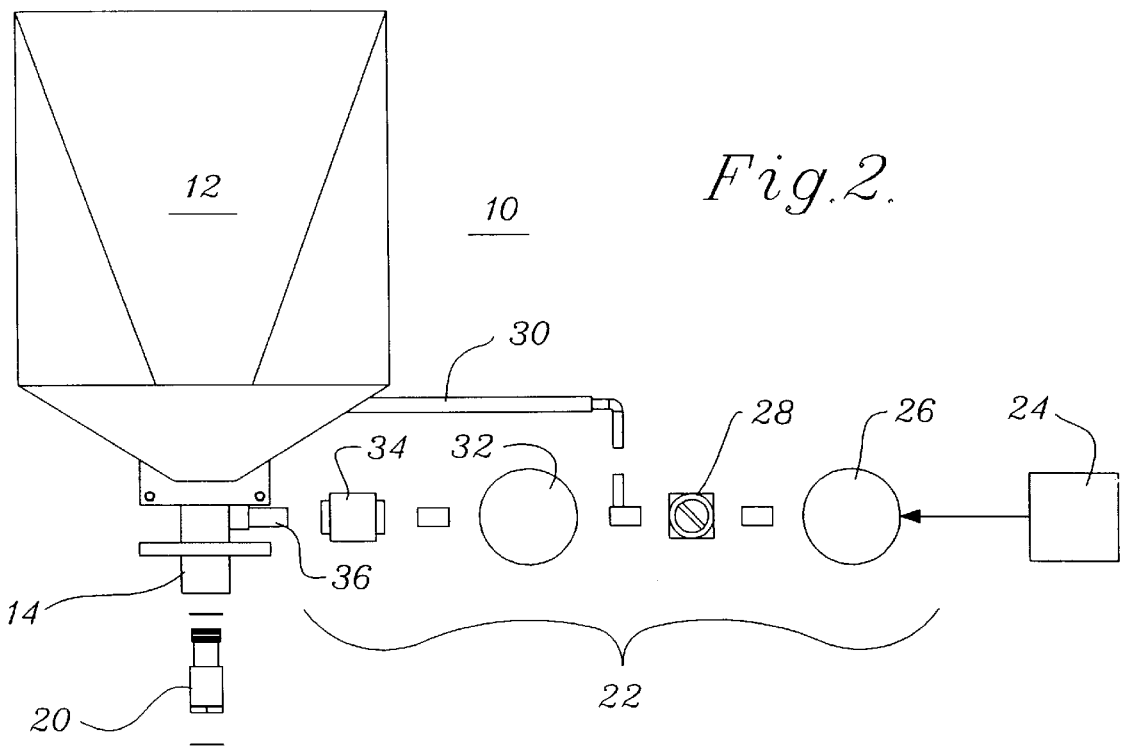
FIG. 2 is an exploded top view of the dispensing apparatus of FIG. 1.
Figure 3:
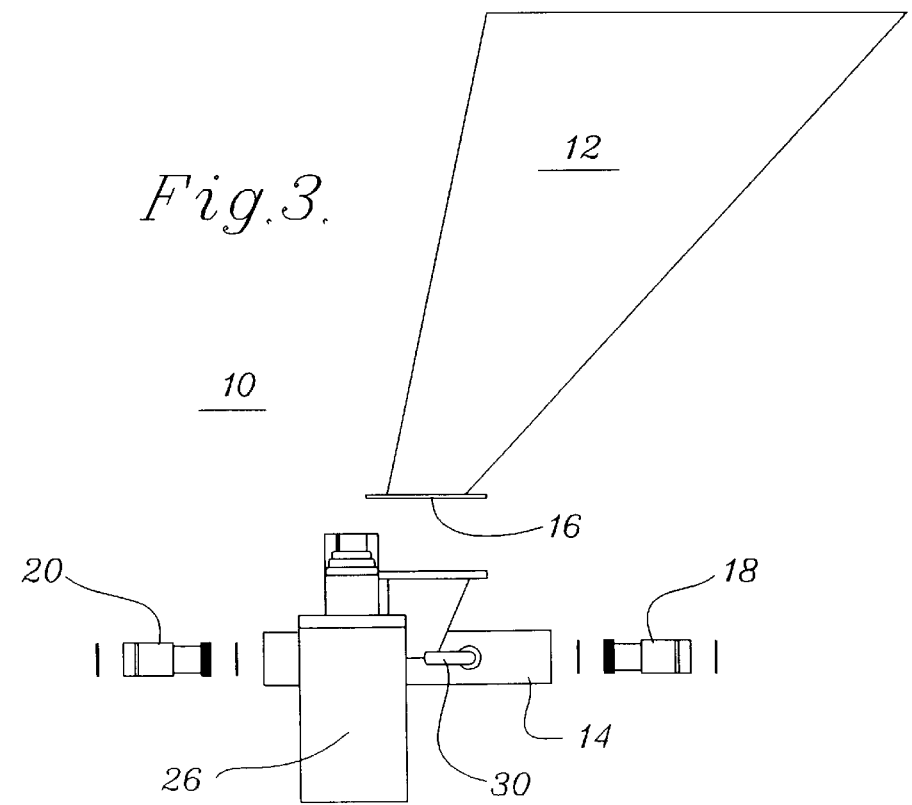
FIG. 3 is an exploded side view of the dispensing apparatus of FIG. 1.

A compressed air material loader can be used as a replacement for the hopper 12 shown in FIGS. 1–3. Such a loader provides better control of the amount of pellets that enter the hopper and may reduce the time needed to drain the hopper 12 if a new pellet type is to be fed to the vessel.

Figure 5:
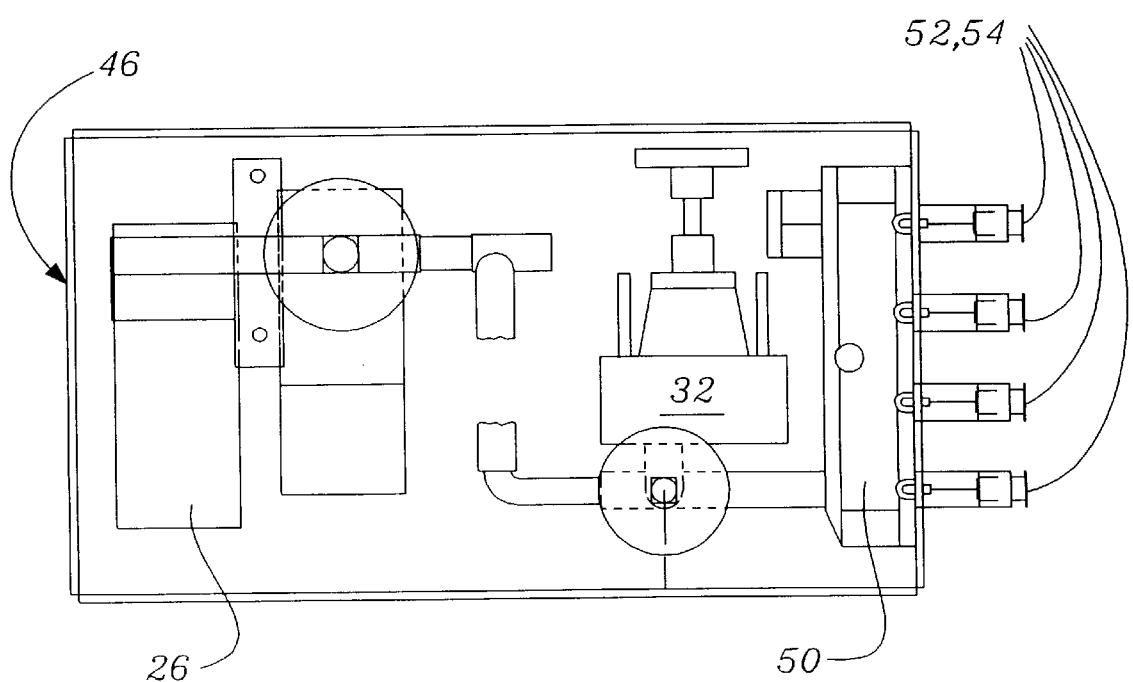
FIG. 5 is a partial sectional view of a second presently preferred embodiment of the dispensing apparatus of the present invention for use with multiple feeder bodies.

FIG. 5 shows a second presently preferred embodiment of the dispensing apparatus 10 in which multiple types of pellets and granular material each having their respective hopper 12 can be introduced into feeder body 14. In the preferred embodiment shown in FIG. 5, most common elements of the pressure regulator system 22 of dispensing apparatus 10 are contained in a single control box 46 with the exception of solenoid valve 34 and drain switch 48. In particular, the control box 46 contains pressure regulator and filter 26 and precision pressure regulator 32. Like the embodiment shown in FIGS. 1–3, the solenoid valve 34 merely turns the feeder "on" and "off". A separate switch 48, shown in FIG. 6, which is provided on the drain unit turns the drain "on" and "off". Control box 46 also includes manifold 50 which, in the embodiment shown in FIG. 5, has 4 pairs of feed outlets 52 and drain outlets 54.

Figure 6:
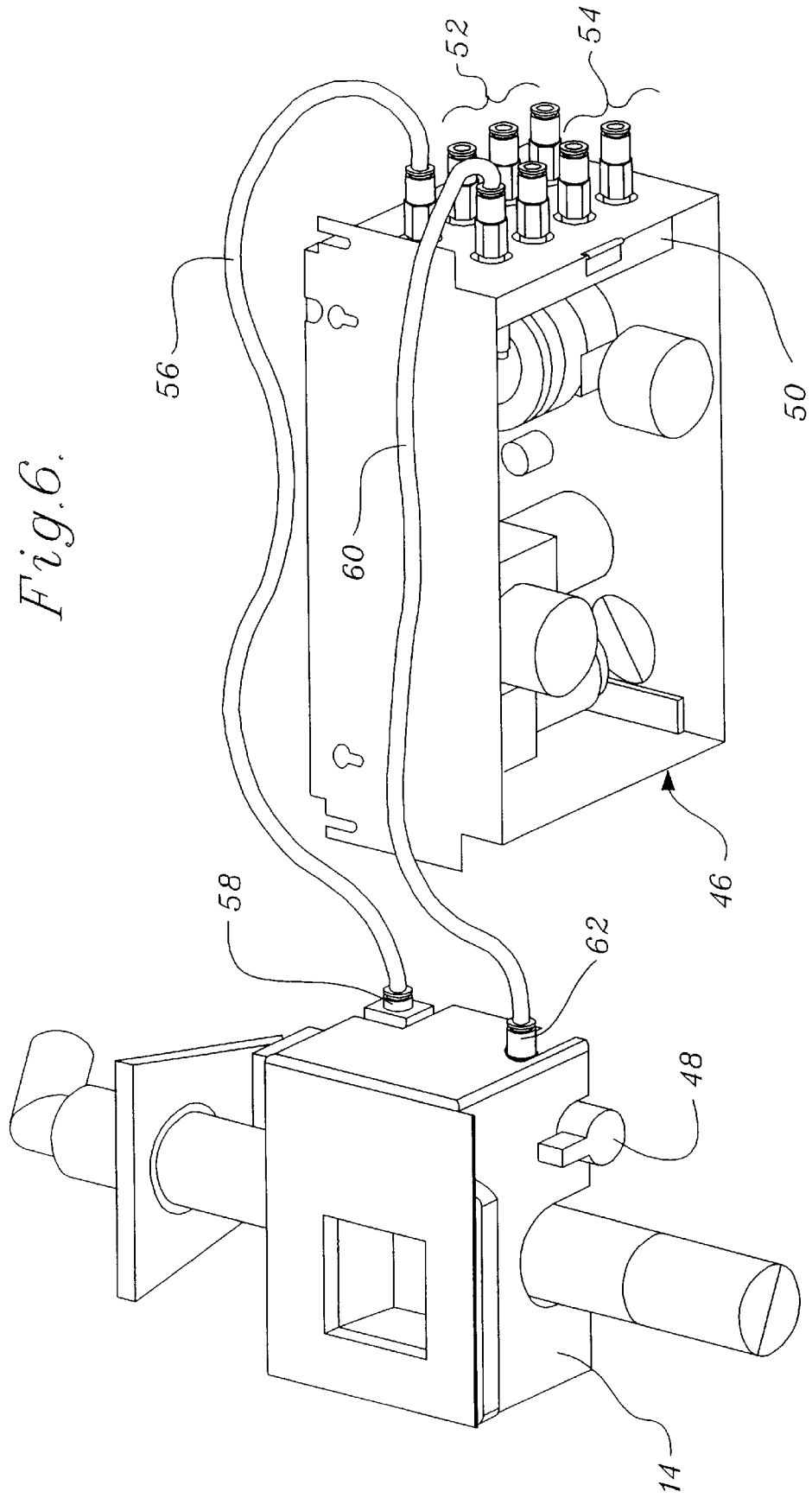
FIG. 6 is a perspective view of the dispensing apparatus of FIG. 5 in connection with one feeder body.

As shown in FIG. 6, each pair of feed outlets 52 and drain outlets 54 may be connected to respective separate feeder bodies 14. Each of the respective feeder bodies 14 can be directed to feed into the same vessel. If desired, the respective feeder bodies 14 can drain into separate drain containers. In operation, one of the feed outlet 52 of control box is connected by means of an ordinary connector tube 56 to feed inlet 58 provided on feeder body 14. The drain outlet 54 paired with the selected feed outlet 52 is likewise connected by means of connector tube 60 to drain inlet 62 provided on the same feeder body 14. The remaining pairs of feed outlets 52 and drain outlets 54 on control box 46 can be connected in a similar manner to additional feeder bodies 14 as needed. Any feed outlet 52 and drain outlet 54 that is not connected with a feeder body 14 is sealed by means of a check valve.

Where more than one feeder body 14 is used, process controls operatively connected to the feeder body 14 controls the operation of the feeding mechanism. The feed operation will be directly controlled by the process controller which will instruct separate feeder bodies 14 to feed the pellets and granular material. In this manner, a single control box 46 can regulate multiple feeder bodies 14.

The terms pellets and granular material have been used herein to describe the particles which are fed through the dispensing apparatus. It is to be understood that the terms pellets and granular materials include such particulate material as powder, pellets, granulated or granular material and fine particulates. The pellets and granular material can include a variety of additive materials such as colorants, slip agents for molds, ultraviolet stabilizers, fire retardants and anti-bacterial agents.

According to the provisions of the patent statutes, we have explained the principle, the preferred construction and mode of operation of our invention and have illustrated and described what we now consider to represent its best embodiment. However, it should be understood that, within the scope of the appended claims, the invention may be practiced otherwise than as specifically illustrated and described.

We claim:

1. A dispensing apparatus for dispensing precisely known quantities of pellets from a hopper to a vessel comprising:

a hopper for holding pellets, said hopper having a bottom opening that is in constant communication with a conveyor tube leading to said vessel;

said conveyor tube extending horizontally below said hopper with said hopper bottom opening communicating with said conveyor tube, a first end of said conveyor tube extending to said vessel;

at least one venturi positioned in said conveyor tube between said bottom opening of said hopper and said vessel, said venturi having an annular chamber into which compressed air is forced, said compressed air entering said conveyor tube so that a vacuum is created in said venturi said venturi having a first passageway directed into said conveyor tube in a direction towards said vessel, said first passageway creating the vacuum in said venturi and a second passageway directed into said conveyor tube in a direction towards said hopper opening, said second passageway aerating the pellets to be drawn into said venturi;

said pellets being moved by said vacuum through said venturi and into said conveyor tube by said vacuum; and a pressure regulator to control the pressure of said compressed air entering said venturi so that the amount of said pellets moved from said hopper to said vessel can be precisely regulated.

2. The dispensing apparatus of claim 1 wherein a second end of said conveyor tube leads to a drain, said apparatus further comprising a second venturi positioned in said conveyor tube between said hopper opening and said drain, said second venturi directing said pellets to said drain.

3. The dispensing apparatus of claim 2 wherein said pressure regulator comprises a precision pressure regulator preset to a preselected value, said precision pressure regulator in communication with a solenoid valve, said solenoid valve controlling flow of said compressed air into said at least one venturi.

4. The pressure regulator of claim 3 further comprising a selector valve for directing said compressed air to one of said first venturi and said second venturi.

5. The dispensing apparatus of claim 1 wherein said pressure regulator comprises a precision pressure regulator preset to a preselected value, said precision pressure regulator in communication with a solenoid valve, said solenoid valve controlling flow of said compressed air into said at least one venturi.

6. A dispensing apparatus for dispensing known quantities of granulated material from a hopper to a vessel comprising:
   a hopper for holding granulated material, said hopper having a bottom opening that is in constant communication with a conveyor tube, a first end of said conveyor tube leading to said vessel and a second end of said conveyor tube leading to a drain;
   means for introducing air under pressure to said conveyor tube at a known pressure and flow rate to collect said granulated material from said hopper bottom opening and convey said granulated material through said conveyor tube toward one of said vessel and said drain;
   means for regulating the pressure of said air under pressure so as to convey a known quantity of said granulated material from said hopper to one of said vessel and said drain; and
   a pair of venturis placed within said conveyor tube, a first of said pair of venturis creating a vacuum which delivers said granulated material to said vessel and a second of said pair of venturis creating a vacuum which delivers said granulated material to said drain.

7. The dispensing apparatus of claim 6 wherein said hopper has no mechanical devices to keep said granulated material from exiting said bottom opening but the angle of repose of said granulated material keeps said granulated material from moving through said conveyor tube until said air under pressure is introduced into said conveying tube.

8. The dispensing apparatus of claim 7 wherein said means for introducing air under pressure to said conveyor tube comprises a solenoid valve in communication with a pressure regulator, said pressure regulator adjusting the pressure of said compressed air and said solenoid valve controlling flow of said compressed air into one of said pair of venturis.

9. The pressure regulator of claim 8 further comprising a selector valve for directing said compressed air to one of said first venturi and said second venturi.

10. The dispensing apparatus of claim 6 wherein said means for introducing air under pressure to said conveyor tube comprises a solenoid valve in communication with a pressure regulator, said pressure regulator adjusting the pressure of said compressed air and said solenoid valve controlling flow of said compressed air into one of said pair of venturis.

11. A dispensing apparatus for dispensing precisely known quantities of pellets from a plurality of hoppers to a vessel comprising:
   a plurality of hoppers for holding pellets, each of said plurality of hoppers having a bottom opening that is in constant communication with one of a plurality of conveyor tubes leading to said vessel;
   said one of a plurality of conveyor tubes extending horizontally below said hopper with each said hopper bottom opening communicating with said one of a plurality of conveyor tubes, a first end of said one of a plurality of conveyor tubes extending to said vessel;
   at least one venturi positioned in said one of a plurality of conveyor tubes between said bottom opening of each of said plurality of hoppers and said vessel, said venturi having an annular chamber into which compressed air is forced, said compressed air entering said one of a plurality of conveyor tubes so that a vacuum is created in said venturi said venturi having a first passageway directed into said one of a plurality of conveyor tubes in a direction towards said vessel, said first passageway creating the vacuum in said venturi and a second passageway directed into said one of a plurality of conveyor tubes in a direction towards said hopper opening, said second passageway aerating the pellets to be drawn into said venturi;
   said pellets being moved by said vacuum through said venturi and into said one of a plurality of conveyor tubes by said vacuum; and
   a pressure regulator to control the pressure of said compressed air entering said venturi so that the amount of said pellets moved from said hopper to said vessel can be precisely regulated.

12. The dispensing apparatus of claim 11 wherein a second end of said one of a plurality of conveyor tubes leads to a drain, said apparatus further comprising a second venturi positioned in said one of a plurality of conveyor tubes between said hopper opening and said drain, said second venturi directing said pellets to said drain.

13. The dispensing apparatus of claim 12 wherein said pressure regulator comprises a precision pressure regulator preset to a preselected value, said precision pressure regulator in communication with a switch, said switch controlling flow of said compressed air into said at least one venturi.

14. The pressure regulator of claim 13 further comprising a drain selector valve for directing said compressed air to said second venturi.

15. The dispensing apparatus of claim 11 wherein said pressure regulator comprises a precision pressure regulator preset to a preselected value, said precision pressure regulator in communication with a switch, said switch controlling flow of said compressed air into said at least one venturi.

16. The dispensing apparatus of claim 11 further comprising a manifold in communication with said pressure regulator, said manifold in communication with said plurality of conveyor tubes, wherein said pressure regulator controls the operation of said plurality of conveyor tubes.

17. The dispensing apparatus of claim 16 wherein said pressure regulator comprises a precision pressure regulator preset to a preselected value, said precision pressure regulator in communication with a valve, said valve controlling flow of said compressed air into said at least one venturi.

18. The pressure regulator of claim 17 further comprising a drain selector valve for directing said compressed air to said second venturi.

* * * * *